(12) United States Patent
Ueda et al.

(10) Patent No.: US 7,223,489 B2
(45) Date of Patent: May 29, 2007

(54) HYDROGEN PURGE CONTROL APPARATUS

(75) Inventors: Kenichiro Ueda, Utsunomiya (JP); Masanori Hayashi, Utsunomiya (JP); Akio Yamamoto, Utsunomiya (JP); Yoshikazu Murakami, Utsunomiya (JP); Satoshi Aoyagi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 502 days.

(21) Appl. No.: 10/621,848

(22) Filed: Jul. 16, 2003

(65) Prior Publication Data

US 2004/0013919 A1 Jan. 22, 2004

(30) Foreign Application Priority Data

Jul. 18, 2002 (JP) .............................. 2002-209746

(51) Int. Cl.
 *H01M 8/04* (2006.01)
 *H01M 2/00* (2006.01)
 *H01M 2/14* (2006.01)
(52) U.S. Cl. ............................ 429/22; 429/23; 429/17; 429/19; 429/34; 429/38; 429/39; 429/13
(58) Field of Classification Search .................. 429/22, 429/23, 13
 See application file for complete search history.

(56) References Cited

U.S. PATENT DOCUMENTS 6,916,563 B2 * 7/2005 Yamamoto et al. ........... 429/17

FOREIGN PATENT DOCUMENTS

| JP | 11-191422 | * | 7/1999 |
|---|---|---|---|
| JP | 11283648 A | | 10/1999 |
| JP | 2000-243417 | | 9/2000 |
| JP | 2002-93438 | | 3/2002 |

* cited by examiner

*Primary Examiner*—Patrick Joseph Ryan
*Assistant Examiner*—Angela J. Martin
(74) *Attorney, Agent, or Firm*—Lahive & Cockfield, LLP; Anthony A. Laurentano, Esq.

(57) ABSTRACT

A hydrogen purge control apparatus includes a fuel cell stack from which hydrogen is purged as necessary, a purged hydrogen dilution device which is disposed downstream of the fuel cell stack, and which has a chamber formed therein, a first inlet for purged hydrogen, a second inlet for air, and an outlet for diluted hydrogen, a regulator which is disposed between the fuel cell stack and the first inlet, and which is provided for regulating an amount of the purged hydrogen flowing into the purged hydrogen dilution device, and a control unit having a hydrogen concentration estimating section that is configured to estimate the hydrogen concentration at the outlet of the purged hydrogen dilution device based on an operating state of the fuel cell stack. The regulator is operated by the control unit depending on the hydrogen concentration estimated by the hydrogen concentration estimating section.

10 Claims, 8 Drawing Sheets

HYDROGEN PURGE CONTROL APPARATUS

BACKGROUND OF THE INVENTION

1. Field of the Invention

The present invention relates to a purge control apparatus for controlling the purging of hydrogen from a fuel cell stack.

2. Description of the Related Art

As a type of fuel cell stack to be installed in a fuel cell powered vehicle, a fuel cell stack is known which includes a fuel cell unit having an anode and a cathode that together sandwich a solid polymer electrolyte membrane therebetween, and in which a fuel gas (e.g., hydrogen gas) is supplied to the anode, and an oxidizing gas (e.g., oxygen or air) is supplied to the cathode so that electrochemical energy produced in an oxidation and reduction reaction of these reaction gases is directly output as electrical energy.

In general, in this type of fuel cell stack, unreacted hydrogen that it is purged from the fuel cell stack is collected and is mixed with fresh fuel gas, and then the gas mixture is supplied to the fuel cell stack again in order to increase fuel-use ratio and to improve fuel economy.

In addition, in this type of fuel cell stack, the reaction gases (hydrogen gas and/or oxidizing gas) are humidified in order to prevent the solid polymer electrolyte membrane from becoming dry so that power generation conditions can be maintained. Furthermore, in this type of fuel cell stack, water is produced by the power generating reaction. The produced water may remain at the anode side of the fuel cell stack (this condition is referred to as "flooding"), and the produced water may inhibit supply of the hydrogen gas, which may lead to unstable power generating conditions.

Furthermore, because nitrogen is contained in air that is supplied to the cathode, although only small amounts thereof permeate the solid polymer electrolyte membrane and are mixed with the hydrogen gas at the anode side, concentration of nitrogen may rise in the course of recycling the hydrogen gas, which may also lead to unstable power generating conditions.

Therefore, in order to ensure continuous stable conditions for power generation in a fuel cell stack, it is necessary to discharge water remaining at the anode side as well as nitrogen that is contained in the hydrogen gas. In order to discharge water and nitrogen, a purging operation is carried out in a circulating flow path for the hydrogen gas; however, the hydrogen gas, which should not be released to the atmosphere without being treated, is discharged as well at the same time in such a purging operation. One of the countermeasures for this problem is to mix the purged hydrogen with air discharged from the cathode side so that hydrogen at a low concentration is released to the atmosphere. A device used for reducing hydrogen concentration is referred to as a purged hydrogen dilution device.

However, designs of such purged hydrogen dilution devices have limitations in terms of installation space. In particular, in a fuel cell system to be installed in a fuel cell powered vehicle, installation space is even further constrained. Due to such limitations, purged hydrogen may not be sufficiently diluted in certain operating states of a fuel cell system.

SUMMARY OF THE INVENTION

In consideration of the above circumstances, an object of the present invention is to provide a hydrogen purge control apparatus by which the hydrogen concentration of fluid that is released to the atmosphere from a purged hydrogen dilution device can be reliably decreased to a level less than a predetermined concentration.

In order to achieve the above object, the present invention provides a hydrogen purge control apparatus including: a fuel cell stack from which hydrogen is purged as necessary; a purged hydrogen dilution device which is disposed downstream of the fuel cell stack, and which includes a chamber formed therein, a first inlet for allowing purged hydrogen to flow into the chamber, a second inlet for allowing air to flow into the chamber, and an outlet for discharging diluted hydrogen from the chamber; a regulator which is disposed between the fuel cell stack and the first inlet, and which is provided for regulating an amount of the purged hydrogen flowing into the purged hydrogen dilution device; a control unit which is operatively connected to the regulator; and a hydrogen sensor which is provided at the outlet of the purged hydrogen dilution device so as to measure the hydrogen concentration at the outlet, and which is connected to the control unit, wherein the control unit is adapted to operate the regulator depending on the hydrogen concentration measured by the hydrogen sensor.

According to the hydrogen purge control apparatus configured as described above, a control operation is executed, i.e., the regulator is operated by the control unit so as to restrain purging when the level of the hydrogen concentration measured by the hydrogen sensor is high; therefore, the hydrogen concentration at the outlet of the dilution region can be reliably reduced.

In the above hydrogen purge control apparatus, the control unit may be adapted to operate the regulator so as to restrain or prohibit flow of the purged hydrogen into the purged hydrogen dilution device when the hydrogen concentration measured by the hydrogen sensor is equal to or greater than a predetermined value.

In the above hydrogen purge control apparatus, the control unit may be adapted to control power generation in the fuel cell stack, and the control unit may be adapted to restrain the power generation when flow of the purged hydrogen into the purged hydrogen dilution device is reduced or prohibited.

According to the hydrogen purge control apparatus configured as described above, electrical power generation in the fuel cell system is restrained, and thus the amounts of reaction gases (i.e., hydrogen and air) to be supplied to the fuel cell system may be reduced.

The present invention provides another hydrogen purge control apparatus including: a fuel cell stack from which hydrogen is purged as necessary; a purged hydrogen dilution device which is disposed downstream of the fuel cell stack, and which includes a chamber formed therein, a first inlet for allowing purged hydrogen to flow into the chamber, a second inlet for allowing air to flow into the chamber, and an outlet for discharging diluted hydrogen from the chamber; a regulator which is disposed between the fuel cell stack and the first inlet, and which is provided for regulating an amount of the purged hydrogen flowing into the purged hydrogen dilution device; and a control unit which is operatively connected to the regulator, and which includes a hydrogen concentration estimating section that is configured to estimate the hydrogen concentration at the outlet of the purged hydrogen dilution device based on an operating state of the fuel cell stack, wherein the control unit is adapted to operate the regulator depending on the hydrogen concentration estimated by the hydrogen concentration estimating section.

According to the hydrogen purge control apparatus configured as described above, a control operation is executed, i.e., the regulator is operated by the control unit so as to restrain purging when the level of the hydrogen concentration estimated by the hydrogen concentration estimating section is high; therefore, the hydrogen concentration at the outlet of the purged hydrogen dilution device can be reliably reduced.

In the above hydrogen purge control apparatus, the hydrogen concentration estimating section may be configured to estimate the hydrogen concentration at the outlet of the purged hydrogen dilution device in such a manner that the hydrogen concentration at the outlet is assumed to increase depending on the amount of the purged hydrogen when a hydrogen purging operation is executed, and to decrease in accordance with a predetermined time constant when a hydrogen purging operation is not executed.

According to the hydrogen purge control apparatus configured as described above, the hydrogen concentration at the outlet of the purged hydrogen dilution device can be more accurately estimated.

In the above hydrogen purge control apparatus, the control unit may be adapted to operate the regulator so as to restrain or prohibit flow of the purged hydrogen into the purged hydrogen dilution device when the hydrogen concentration estimated by the hydrogen concentration estimating section is equal to or greater than a predetermined value.

In the above hydrogen purge control apparatus, the control unit may be adapted to control power generation in the fuel cell stack, and the control unit may be adapted to restrain the power generation when the flow of the purged hydrogen into the purged hydrogen dilution device is reduced or prohibited.

According to the hydrogen purge control apparatus configured as described above, electrical power generation in the fuel cell system is restrained, and thus the amount of reaction gases (i.e., hydrogen and air) to be supplied to the fuel cell system may be reduced.

DESCRIPTION OF THE PREFERRED EMBODIMENTS

A first embodiment of a hydrogen purge control apparatus according to the invention will be explained blow with reference to FIGS. 1 to 9. The embodiment to be explained below is an example of a hydrogen purge control apparatus for a fuel cell system that is to be installed in a fuel cell powered vehicle.

Figure 1:
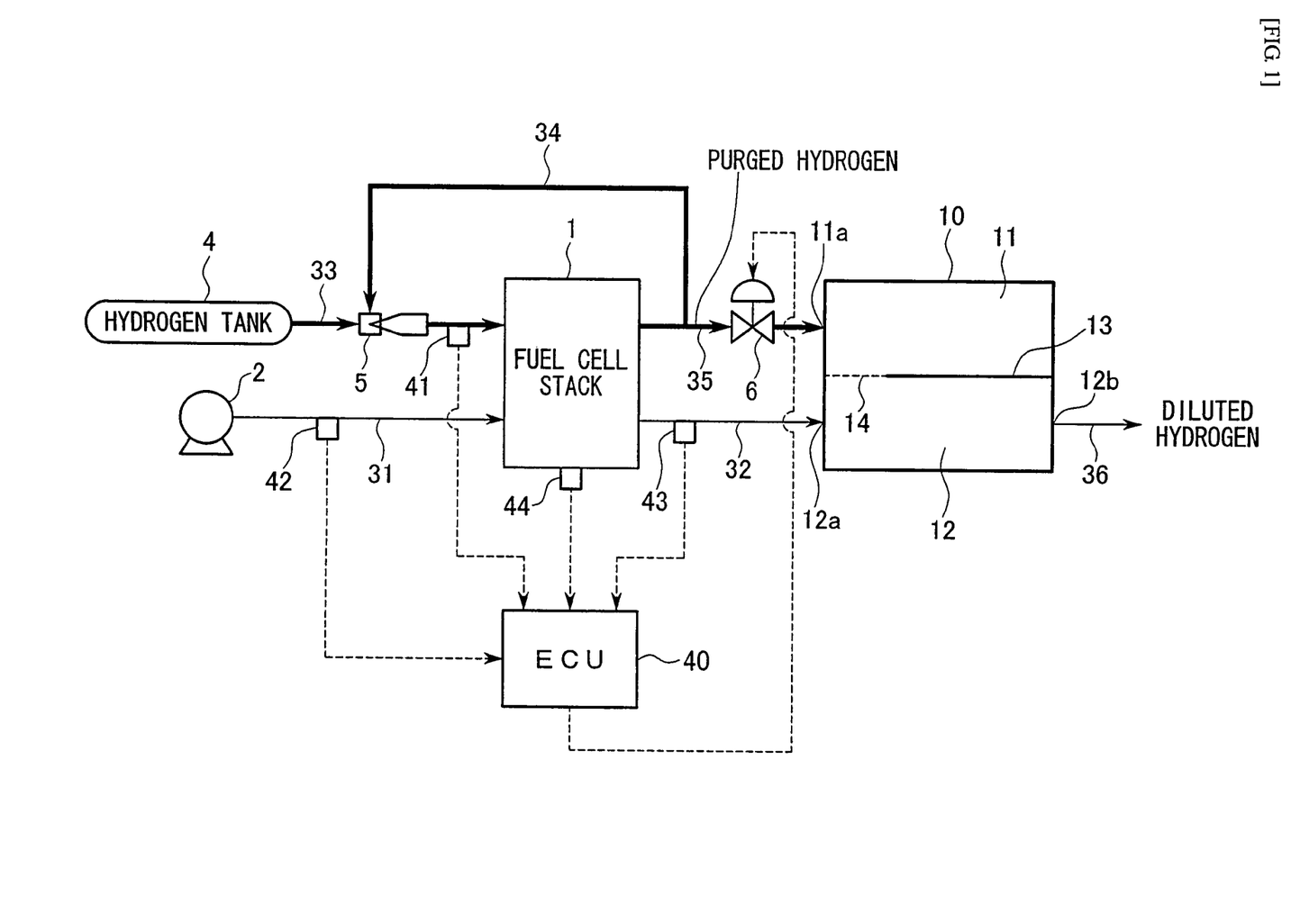
FIG. 1 is a schematic block diagram showing a first embodiment of a fuel cell system having a hydrogen purge control apparatus according to the present invention.

FIG. 1 is a schematic block diagram of a fuel cell system having a hydrogen purge control apparatus.

A fuel cell stack 1 is a stack that is formed by stacking a plurality of fuel cell units, each of which includes a solid polymer electrolyte membrane consisting of, for example, a solid polymer ion exchange membrane, and an anode and a cathode that sandwich the solid polymer electrolyte membrane therebetween. When hydrogen as a fuel gas is supplied to the anode, and air containing oxygen as an oxidizing gas is supplied to the cathode, hydrogen ions are produced in the anode area by catalytic reaction, which pass through the solid polymer electrolyte membrane, and which reach the cathode area where the hydrogen ions electrochemically react with oxygen so that electrical power is generated, and water is produced. Because a portion of the water produced in the cathode area permeates the solid polymer electrolyte membrane so as to diffuse into the anode area, there is also water in the anode area.

Air is pressurized by compressor 2 to a predetermined pressure, and the pressurized air is supplied to the cathode of each of the fuel cell units of the fuel cell stack 1 through an air supply passage 31. The air supplied to the fuel cell stack 1 is used for power generation, and is discharged from the fuel cell stack 1 to an air discharge passage 32 along with condensed water contained in the cathode area, and then the discharged air is introduced into a purged hydrogen dilution device 10. In the following description, the air supplied to the fuel cell stack 1 is referred to as "supplied air", and the air discharged from the fuel cell stack 1 is referred to as "discharged air", respectively, in order to distinguish them from each other.

On the other hand, hydrogen gas supplied from a hydrogen tank 4 is supplied to the anode of the fuel cell stack 1 through a hydrogen gas supply passage 33. Unreacted hydrogen gas, i.e., unused hydrogen gas is discharged from the anode area to a hydrogen gas circulating flow path 34 along with condensed water contained in the anode area, and then the discharged hydrogen is introduced into the hydrogen gas supply passage 33 via an ejector 5. In other words, hydrogen gas discharged from the fuel cell stack 1 is mixed with fresh hydrogen gas supplied from the hydrogen tank 4, and the mixture is supplied to the anode area of the fuel cell stack 1 again. A hydrogen pump may be used instead of the ejector 5.

A hydrogen gas purging passage 35, which includes a purge valve 6, branches off the hydrogen gas circulating flow path 34. The hydrogen gas purging passage 35 is connected to the purged hydrogen dilution device 10. Note that the purge valve 6 may be substituted by one of various types of regulators.

The purged hydrogen dilution device 10 is a container whose interior is divided by a partition 13 into a holding chamber 11 and a dilution chamber 12. The partition 13 is, for example, a metal plate having a number of small holes as communication holes 14 therein (generally referred to as a "punched metal") or of porous ceramics. The dilution chamber 12 and the holding chamber 11 are allowed to communicate with each other via the communication holes 14.

The hydrogen gas purging passage 35 is connected to an inlet 11a (a first inlet) of the holding chamber 11. When the purge valve 6 is opened, the hydrogen gas discharged from the fuel cell stack 1 flows into the holding chamber 11 via the hydrogen gas circulating flow path 34 and the hydrogen gas purging passage 35, and remains in the holding chamber 11.

The air discharge passage 32 is connected to an inlet 12a (a second inlet) of the dilution chamber 12. The discharged air discharged from the fuel cell stack 1 flows into the dilution chamber 12 via the air discharge passage 32. The fluid in the dilution chamber 12 is discharged from an outlet 12b, which is provided in the opposed side with respect to the inlet 12a, via a discharge pipe 36. Therefore, the discharged air flows in the dilution chamber 12 whenever the discharged air is being discharged from the fuel cell stack 1.

The air supply passage 31 is provided with a flow sensor 42 for measuring flow rate of the supplied air that flows through the air supply passage 31. The air discharge passage 32 is provided with a temperature sensor 43 for measuring the temperature of the discharged air that flows through the discharge passage 32. The hydrogen gas supply passage 33 is provided with a pressure sensor 41, at a position downstream ejector 5, for measuring the pressure of hydrogen gas flowing through the hydrogen gas supply passage 33 (i.e., the pressure of supplied hydrogen). The fuel cell stack 1 is provided with a cell voltage sensor 44 for measuring cell voltage of each of the fuel cell units that constitute the fuel cell stack 1. The output signals of the above sensors 41 to 44 are input into an ECU 40 as a control unit.

According to the present embodiment, in the fuel cell system configured as described above, a purging operation is executed for a predetermined time by opening the purge valve 6 when power generation of the fuel cell stack 1 progresses slowly in order to remove water and nitrogen in the anode area.

During the purging operation in which the purge valve 6 is opened, hydrogen gas purged from the fuel cell stack 1 flows into the holding chamber 11, and diffuses in the entirety of the holding chamber 11. When the purge valve 6 is closed, flow of hydrogen gas into the holding chamber 11 is stopped. On the other hand, because the discharged air flows through the dilution chamber 12 regardless of opening and shutting of the purge valve 6, hydrogen gas remaining in the holding chamber 11 is gradually drawn into the dilution chamber 12 through the communication holes 14, and is mixed with the discharged air in dilution chamber 12 so as to be diluted. As a result, it is possible to lower the hydrogen concentration of the gas discharged from the outlet 12b of the dilution chamber 12 to a level lower than a predetermined concentration (for example, 4% by volume), and gas at a low hydrogen concentration can be discharged from the discharge pipe 36.

Because there is a limit to dilution performance of the purged hydrogen dilution device 10, the hydrogen concentration at the outlet 12b of the dilution chamber 12 may not be lowered to a level lower than a predetermined concentration depending on the operation state of the fuel cell stack 11 and frequency of purging operations. In order not to have such a problem, in this hydrogen purge control apparatus, opening of the purge valve 6 for a purging operation is restrained when the hydrogen concentration at the outlet 12b of the dilution chamber 12 or the hydrogen concentration in the downstream of the outlet 12b becomes equal to or greater than the predetermined concentration so as to lower the hydrogen concentration at the outlet 12b of the dilution chamber 12 to a level lower than the predetermined concentration.

In particular, in this embodiment, the hydrogen concentration at the outlet 12b of the dilution chamber 12 is estimated based on the operating state of the fuel cell stack 1, and when an estimated hydrogen concentration becomes equal to or greater than the predetermined concentration, the purging operation is controlled to be restrained as explained above.

Next, a hydrogen purge control operation in this embodiment will be explained with reference to a flow chart shown in FIG. 2.

Figure 2:
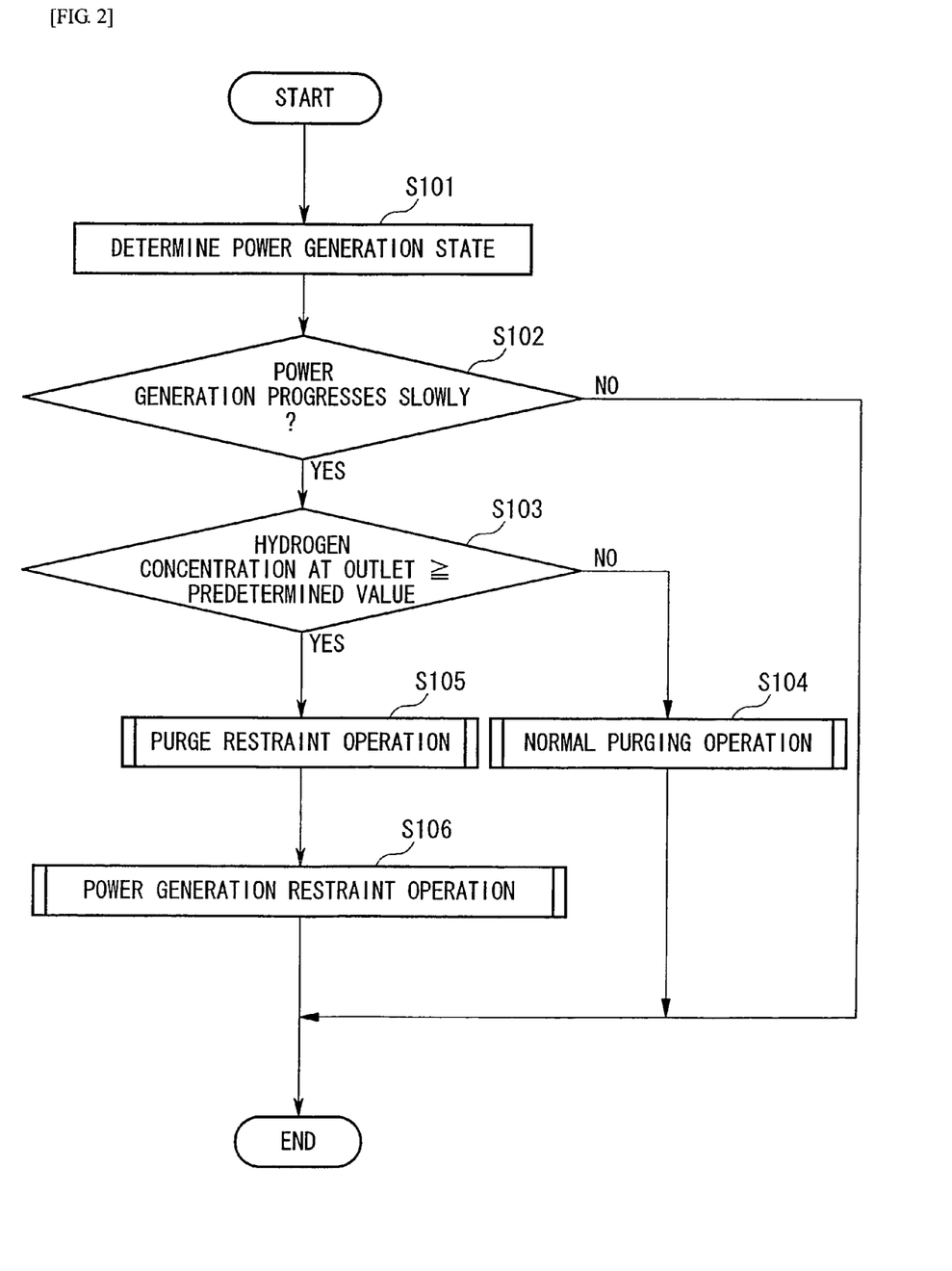
FIG. 2 is a flow chart showing a hydrogen purge control operation in the first embodiment.

The flow chart shown in FIG. 2 represents a control routine for hydrogen purging. The control routine for hydrogen purging is periodically executed by the ECU 40.

In step S101, cell voltage of each of the fuel cell units measured by the cell voltage sensor 44 is read in, and the power generation state of the fuel cell stack 1 is determined.

Next, the operation proceeds to step S102, in which it is determined whether or not the power generation state of fuel cell stack 1 is in a degraded condition based on cell voltage of each of the fuel cell units. More specifically, it is determined that the power generation progresses slowly when cell voltage of each of the fuel cell units is lower than a predetermined voltage, and it is determined that power generation progresses smoothly when cell voltage of each of the fuel cell units is equal to or greater than the predetermined voltage.

When the result of the determination in step S102 is "NO" (i.e., power generation progresses smoothly), because a purging operation is not required, the control operation in this routine is once terminated.

When the result of the determination in step S102 is "YES" (i.e., power generation progresses slowly), the operation proceeds to step S103, in which it is determined whether the hydrogen concentration at the outlet 12b of the dilution chamber 12 is equal to or greater than a predetermined value. In this embodiment, the hydrogen concentration which is referred to is the hydrogen concentration at the outlet 12b of the dilution chamber 12 as estimated based on the operating state of fuel cell stack 1. An operation for estimating hydrogen concentration will be explained in detail separately.

When the result of the determination in step S103 is "NO" (i.e., the hydrogen concentration at the outlet is less than a predetermined value), because a purging operation does not have to be restrained, the operation proceeds to step S104, in which a purging operation is executed, and then the control operation in this routine is once terminated. The normal purging operation is executed by opening the purge valve 6 for a predetermined period. The purge valve 6 may be opened just one time for a purging operation, and alternatively, the purge valve 6 may be opened plural times at a predetermined interval for a purging operation.

When the result of the determination in step S103 is "YES" (i.e., the hydrogen concentration at the outlet is equal to or greater than a predetermined value), because it is necessary to restrain a purging operation, the operation proceeds to step S105, in which a purge restraint operation is executed. A purge restraint operation may be executed in such a manner that open of the purge valve 6 is prohibited, or may be executed in such a manner that open retention time of the purge valve 6 is shortened. Alternatively, in the case in which the purge valve 6 is controlled so as to open plural times for a purging operation, the interval between opening operations may be set longer. In any case, in a purge restraint operation, the purge valve 6 is controlled so that the amount of the purged hydrogen purged from the fuel cell stack 1 is decreased.

By executing a purge restraint operation in any of the above manners, the hydrogen concentration of the gas discharged from the discharge pipe 36 may be reliably lowered to a level lower than the predetermined concentration.

Next, the operation proceeds from step S105 to step S106, in which a power generation restraint operation is executed, i.e., electrical power generation of the fuel cell stack 1 is restrained while a purge restraint operation is executed.

Although it is not shown in FIG. 1, a control valve, which is operated by the ECU 40, may be provided on the hydrogen gas supply passage 33 so that the electrical power generation of the fuel cell stack 1 may be controlled by the ECU 40. More specifically, the electrical power generation of the fuel cell stack 1 may be restrained by operating the control valve so as to reduce the amount of hydrogen that is supplied to the fuel cell stack 1.

By restraining power generation of the fuel cell stack 1, the amount of the reaction gases (hydrogen and air) to be supplied to the fuel cell stack 1 may be reduced. Consequently, in the case in which the reaction gases are humidified, the amount of humidification can be also reduced, the amount of condensed water may be reduced, and the amount of nitrogen permeating into the anode area may also be reduced. As a result, power generation performance of the fuel cell stack 1 may be prevented from degrading during execution of a purge restraint operation.

Next, an operation for estimating the hydrogen concentration at the outlet 12$b$ of the dilution chamber 12 will be explained below with reference to FIGS. 3 to 9.

Figure 3:
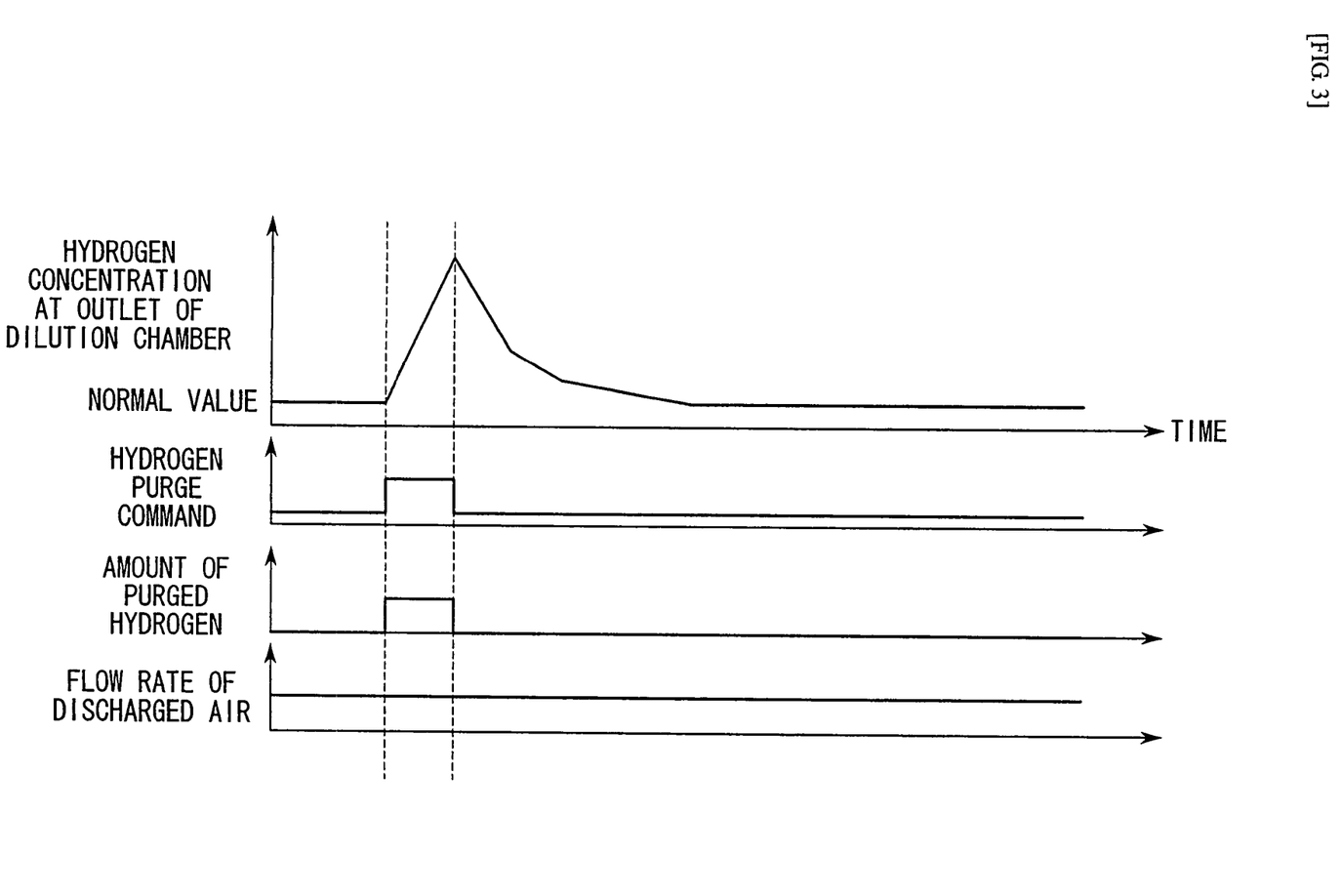
FIG. 3 is a time-domain graph showing change in hydrogen concentration at an outlet of a purged hydrogen dilution device.

FIG. 3 is a time-domain graph showing an example of change in the hydrogen concentration at the outlet 12$b$ before and after a hydrogen purging operation. In this example, hydrogen is purged at a constant flow rate in a period in which a hydrogen purge command is provided. It is assumed that the discharged air is discharged from the fuel cell stack 1 at a constant flow rate before and after the hydrogen purging operation. In this case, the hydrogen concentration at the outlet 12$b$ increases as the amount of hydrogen in the holding chamber 11 increases due to purging through the purge valve 6 from beginning of the hydrogen purge command to the end of the hydrogen purge command, and increase in the amount of hydrogen in the holding chamber 11 is stopped upon ending of the hydrogen purge command, and then the hydrogen concentration at the outlet 12$b$ decreases at a predetermined time constant so as to finally converge into a predetermined fixed value (hereinafter referred to as a normal value of hydrogen concentration). The time constant is determined depending on the capacity or shape of the purged hydrogen dilution device 10 and flow rate of the discharged air. In this embodiment, the hydrogen concentration at the outlet 12$b$ of the dilution chamber 12 is estimated in such manner as explained above.

Hereafter, the operation for estimating the hydrogen concentration is more specifically explained.

Figure 4:
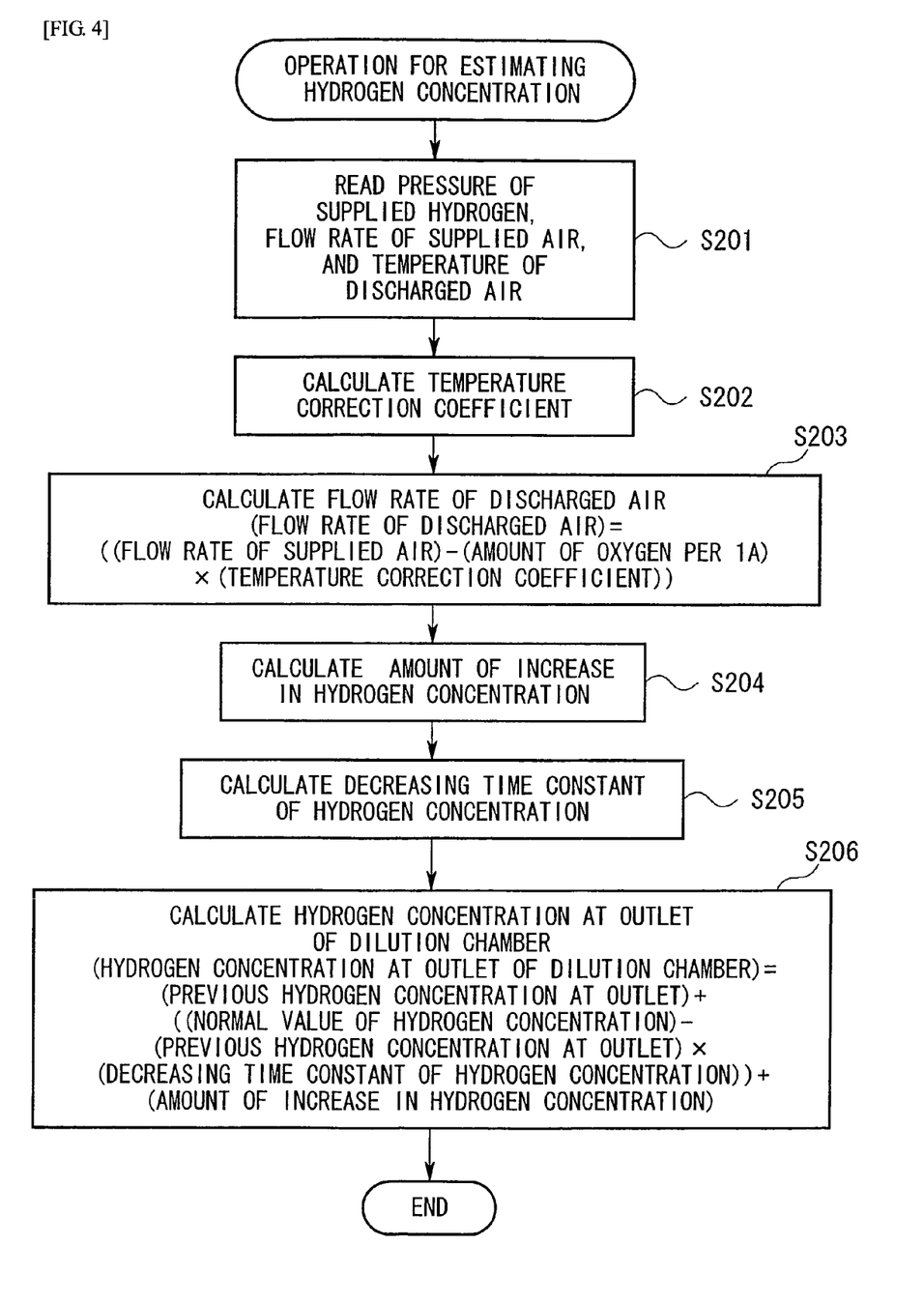
FIG. 4 is a flow chart showing an operation for estimating hydrogen concentration in the first embodiment.

The flow chart shown in FIG. 4 represents a control routine for the operation for estimating the hydrogen concentration, and this control routine for the operation for estimating the hydrogen concentration is periodically executed by the ECU 40.

In step S201, the pressure of supplied hydrogen measured by the pressure sensor 41, flow rate of the supplied air measured by the flow sensor 42, and the temperature measured by the temperature sensor 43 are read in.

Figure 5:
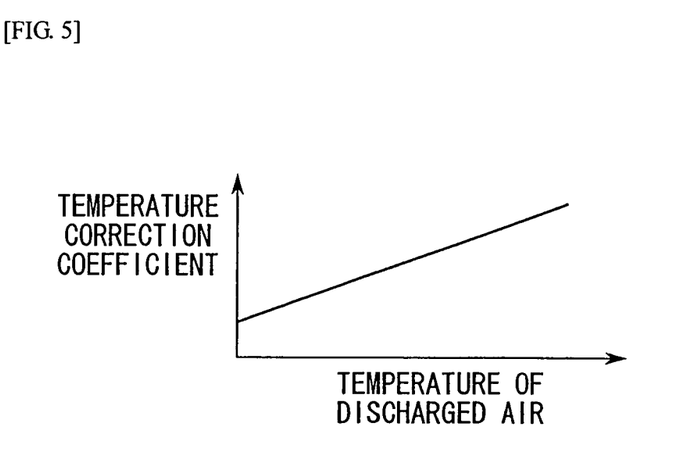
FIG. 5 is a graph which is drawn based on an example of a temperature correction coefficient table in the first embodiment.

Next, in step S202, by referring to a temperature correction coefficient table that is prepared beforehand as shown in FIG. 5, a temperature correction coefficient is calculated based on the temperature of the discharged air. A temperature correction coefficient is introduced because flow rate of the discharged air is calculated based on flow rate of the supplied air as will be explained below, air is heated and expands due to power generation of the fuel cell stack 1. Accordingly, in the temperature correction coefficient table, the temperature correction coefficient is set to be greater as the temperature of the discharged air rises.

Next, the operation proceeds to step S203, in which flow rate of the discharged air is calculated. Flow rate of the discharged air may be calculated by multiplying a difference, which is obtained by subtracting the amount of oxygen consumed for power generation from the amount of the supplied air, by a temperature correction coefficient. The amount of oxygen consumed for power generation may be calculated by multiplying the amount of consumed oxygen per 1 A (ampere) by generated electrical current. Accordingly, flow rate of the discharged air may be calculated using the following equation:

(flow rate of the discharged air)=((flow rate of the supplied air)−(amount of oxygen consumption per 1 A))×(temperature correction coefficient).

Figure 6:
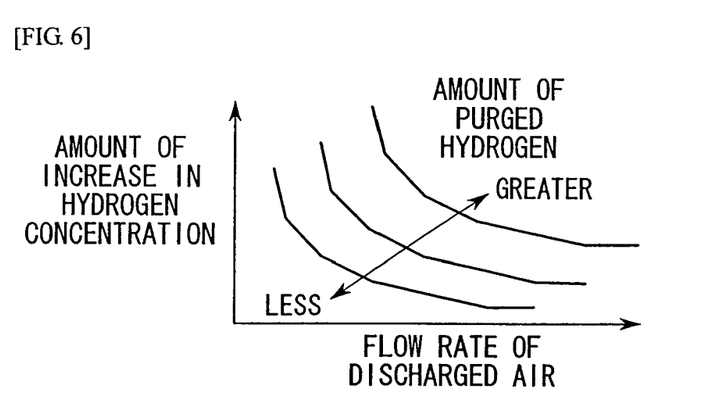
FIG. 6 is a graph which is drawn based on an example of a map defining an amount of increase in hydrogen concentration in the first embodiment.

Next, the operation proceeds to step S204, in which the amount of increase in the hydrogen concentration per control cycle is calculated with reference to a map defining the amount of increase in the hydrogen concentration shown in FIG. 6 that is prepared beforehand. The map for the amount of increase in the hydrogen concentration is a three-dimensional map defining relationship among the amount of increase in the hydrogen concentration, the amount of the purged hydrogen, and flow rate of the discharged air. In this map, the amount of increase in the hydrogen concentration is set to be less as the flow rate of the discharged air increases when the amount of the purged hydrogen is unchanged, the amount of increase in the hydrogen concentration is set to be greater as the amount of the purged hydrogen increases when the flow rate of the discharged air is unchanged.

Figure 7:
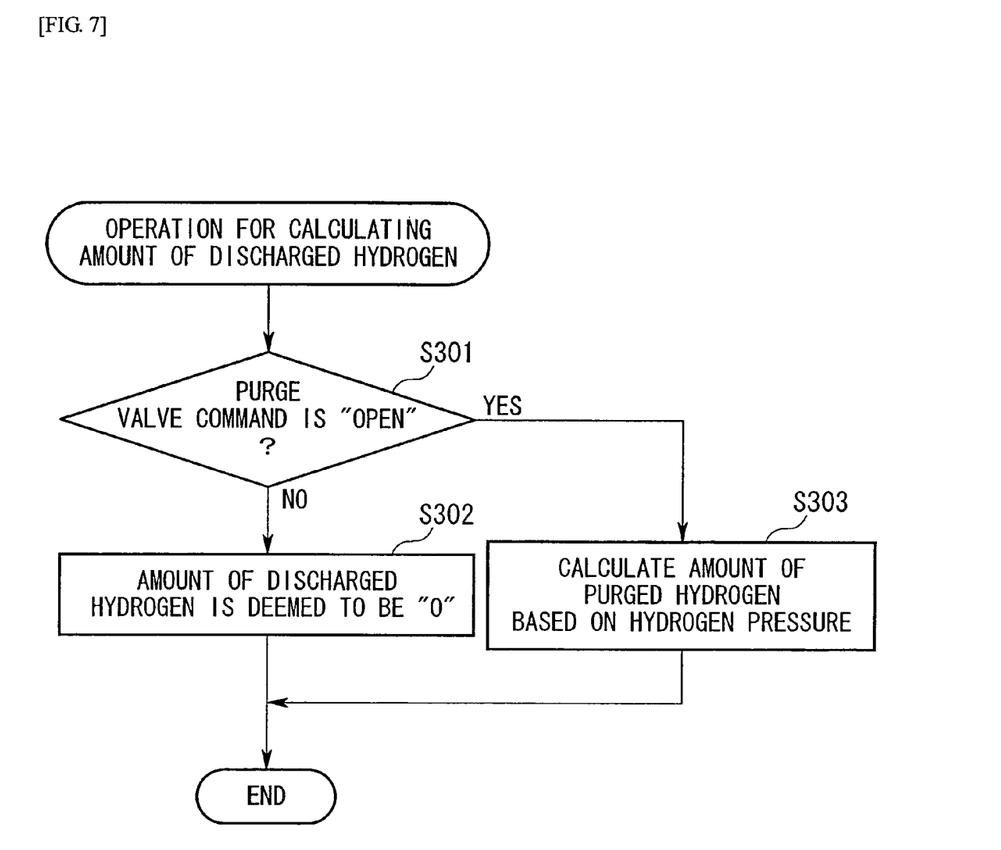
FIG. 7 is a flow chart showing an operation for calculating an amount of purged hydrogen in the first embodiment.
Figure 8:
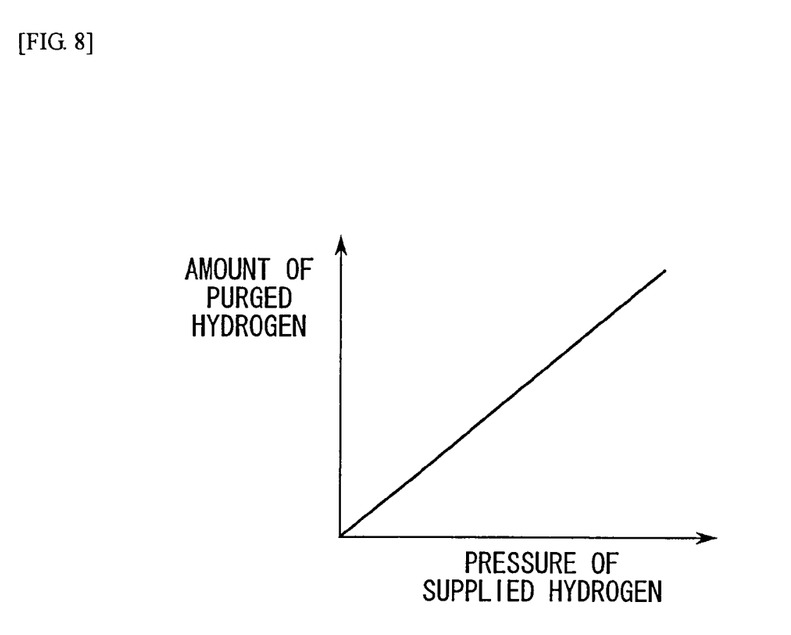
FIG. 8 is a graph which is drawn based on an example of a table defining an amount of purged hydrogen in the first embodiment.

The amount of the purged hydrogen is calculated by executing the operation for calculating the amount of the purged hydrogen shown in FIG. 7. In the operation for calculating the amount of the purged hydrogen, it is determined whether a command sent to the purge valve 6 is "open" (in step S301). When it is determined that the command is "close", the amount of the purged hydrogen is deemed to be "0" (in step S302). When it is determined that the command is "open", the amount of the purged hydrogen is calculated based on a table, shown in FIG. 8, defining the amount of the purged hydrogen that is prepared beforehand (in step S303). This procedure is based on the fact that the amount of the purged hydrogen is determined depending on the pressure of the supplied hydrogen when the opening degree of the purge valve 6 is constant, and more specifically, the amount of the purged hydrogen is increased as the pressure of the supplied hydrogen increases.

Figure 9:
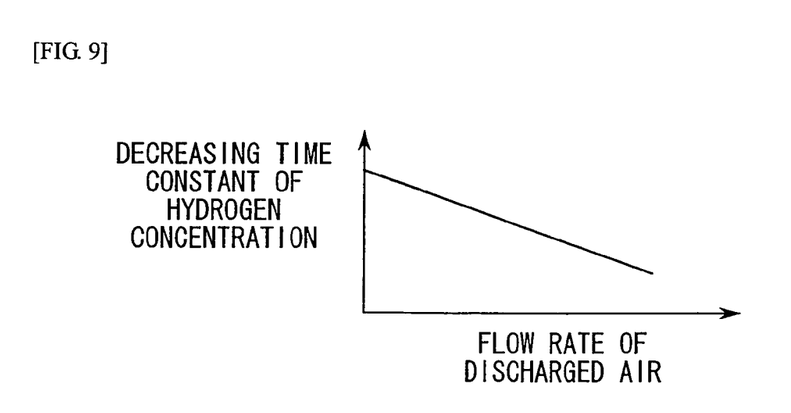
FIG. 9 is a graph which is drawn based on an example of a table defining a time constant in the first embodiment.

Next, the operation proceeds form step S204 to step S205, in which a decreasing time constant of hydrogen concentration (hereinafter simply referred to as a time constant) is calculated base on the flow rate of the discharged air calculated in step S203 and with reference to a time constant table as shown in FIG. 9 that is prepared beforehand. In a time constant table, the time constant is set to be smaller as the flow rate of the discharged air increases.

Next, the operation proceeds to step S206, in which the hydrogen concentration at the outlet 12b of the dilution chamber 12 is calculated. The hydrogen concentration at the outlet 12b is calculated by adding the amount of decrease in hydrogen concentration decreasing at the time constant in a control cycle and the amount of increase in hydrogen concentration increasing in a control cycle calculated in step S204 to the hydrogen concentration at the outlet 12b calculated in the previous routine (hereinafter referred to as "previous hydrogen concentration at the outlet"). The amount of decrease in hydrogen concentration decreasing at the time constant in a control cycle may be calculated by multiplying a value, which is obtained by subtracting the previous hydrogen concentration at the outlet from the normal value of hydrogen concentration, by the time constant. Accordingly, the hydrogen concentration at the outlet 12b may be calculated using the following equation:

(hydrogen concentration)=(the previous hydrogen concentration at the outlet)+((the normal value of hydrogen concentration)−(the previous hydrogen concentration at the outlet)×(the time constant))+(the amount of increase in hydrogen concentration).

In the manner explained above, the hydrogen concentration of outlet 12b of the dilution chamber 12 can be accurately estimated based on the operating state of the fuel cell stack 1.

Because a control operation for restraining purging is executed based on the accurately estimated hydrogen concentration at the outlet 12b, the hydrogen concentration of the gas that it is discharged from discharge pipe 36 can be reliably controlled to a level lower than the predetermined concentration.

In this embodiment, the hydrogen concentration estimating section is realized by executing operations in steps S201 to S206.

In the operation for estimating the hydrogen concentration explained above, flow rate of the supplied air that it used as a basis for calculating flow rate of the discharged air is measured using the flow sensor 42; however, flow rate of the supplied air may be calculated, instead of providing the flow sensor 42, based on a supplied air flow rate command that is determined depending on the desired output of the fuel cell stack 1.

Alternatively, instead of calculating flow rate of the discharged air in step S203 in the operation for estimating the hydrogen concentration shown in FIG. 4, flow rate of the discharged air may be determined with reference to a map defining a relationship between flow rate of the supplied air and flow rate of the discharged air, which is prepared beforehand.

Moreover, in step S303 in the operation for calculating the amount of the purged hydrogen shown in FIG. 7, the amount of the purged hydrogen is calculated based on the pressure of supplied hydrogen; however, a pressure sensor may be provided at the outlet of the anode area of fuel cell stack 1 instead of providing the pressure sensor 41 at the inlet of the anode area, and the amount of the purged hydrogen may be calculated based on the hydrogen pressure at the outlet of the anode area measured by the alternative pressure sensor.

Alternatively, a flowmeter may be provided on the hydrogen gas purging passage 35, and the amount of the purged hydrogen may be directly measured.

Figure 10:
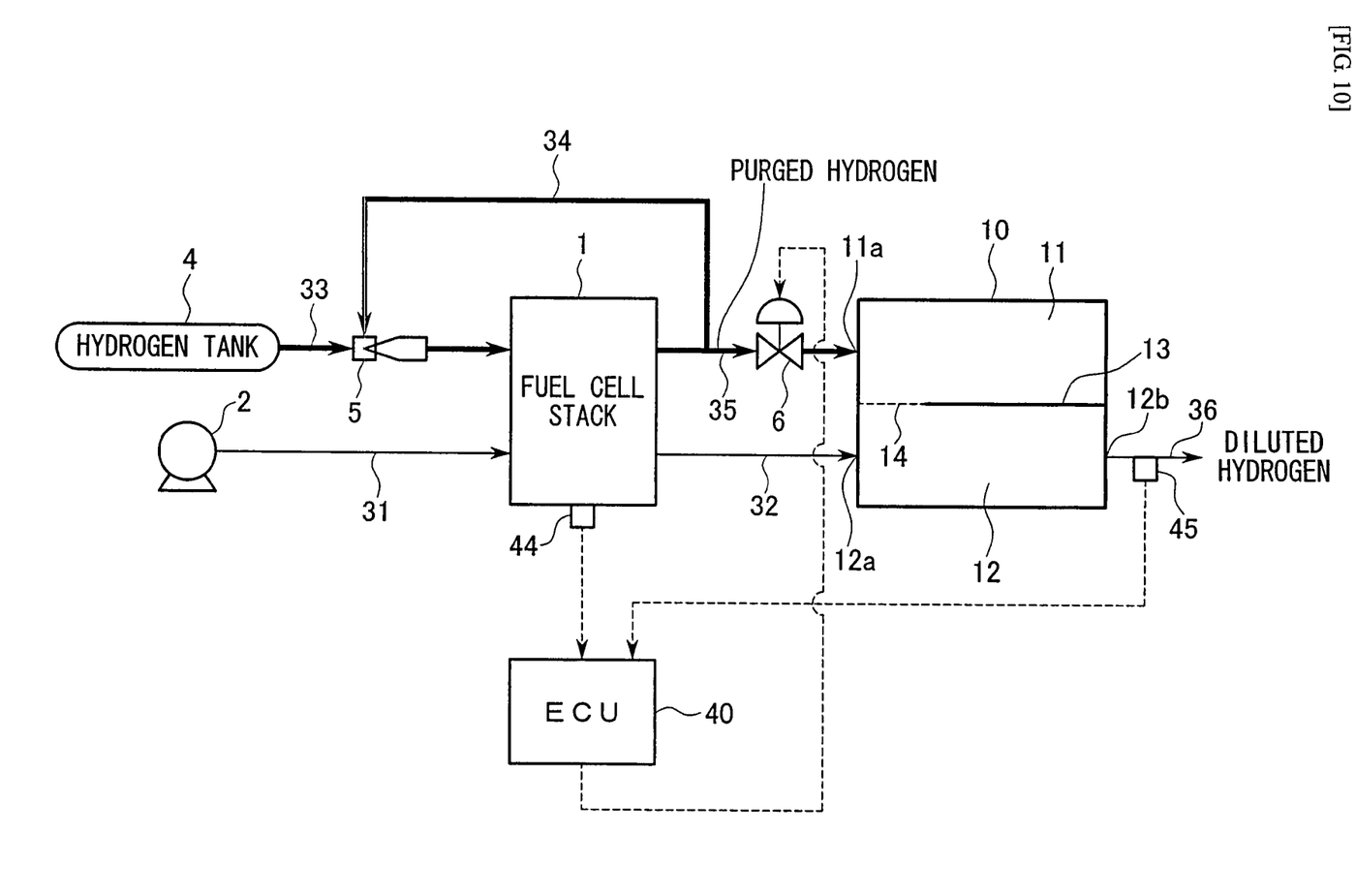
FIG. 10 is a schematic block diagram showing a second embodiment of a fuel cell system having a hydrogen purge control apparatus according to the present invention.

Furthermore, in the above embodiment, the hydrogen concentration at the outlet 12b of the dilution chamber 12 in the purged hydrogen dilution device 10 is estimated based on the operating state of the fuel cell stack 1, and the purging operation is controlled based on the estimated hydrogen concentration; however, a hydrogen sensor 45 may be provided in the downstream of the purged hydrogen dilution device 10, i.e., to the discharge pipe 36 coupled to the outlet 12b of the dilution chamber 12 as shown in FIG. 10, and the purging operation may be controlled based on the hydrogen concentration measured by the hydrogen sensor 45. In this case, in step S103 in the control routine for hydrogen purging shown in FIG. 2, the hydrogen concentration value measured by the hydrogen sensor 45 may be deemed to be the hydrogen concentration at the outlet 12b of the dilution chamber 12 instead of using the estimated hydrogen concentration, and the hydrogen purging may be controlled in such a manner that a purge restraint operation is executed when the measured hydrogen concentration value is equal to or greater than a predetermined value, and normal purging operation is executed when the measured hydrogen concentration value is less than a predetermined value. By providing the hydrogen sensor 45 as described above, because the hydrogen concentration at the downstream of the purged hydrogen dilution device 10 can be accurately measured, the hydrogen concentration of the gas that it is discharged from discharge pipe 36 can be reliably controlled to a level lower than the predetermined concentration.

Furthermore, in the above embodiment, a purging operation is applied to the fuel cell stack 1 when power generation progresses slowly; however, timing of execution of a purging operation is not limited to this, and, for example, purging operations may be executed periodically at a predetermined interval regardless of the state of power generation. The present invention may also be applied to such cases.

Advantageous Effects Obtainable by the Invention

As explained above, according to the present invention, because the hydrogen concentration at the outlet of the purged hydrogen dilution device can be reduced by executing a control operation so as to restrain purging when the level of the hydrogen concentration value measured by the hydrogen sensor is high, the hydrogen concentration of the fluid discharged from the purged hydrogen dilution device may be reliably lowered to a level lower than the predetermined concentration.

According to another aspect of the present invention, because the hydrogen concentration at the outlet of the purged hydrogen dilution device can be reduced by executing a control operation so as to restrain purging when the level of the hydrogen concentration value estimated by the hydrogen concentration estimating section is high, the hydrogen concentration of the fluid discharged from the purged hydrogen dilution device may be reliably lowered to a level lower than the predetermined concentration. In addition, because the hydrogen concentration at the outlet of the purged hydrogen dilution device is estimated using the hydrogen concentration estimating section, a hydrogen sensor does not have to be provided.

According to another aspect of the present invention, because the hydrogen concentration at the outlet of the purged hydrogen dilution device may be more accurately estimated, the hydrogen concentration of the fluid discharged from the purged hydrogen dilution device may be more reliably lowered to a level lower than the predetermined concentration.

According to another aspect of the present invention, because the amount of the reaction gases (hydrogen and air) to be supplied to the fuel cell stack 1 may be reduced by restraining power generation of the fuel cell stack 1, the amount of humidification can be also reduced in the case in which the reaction gases are humidified. In addition, the amount of condensed water may also be reduced, and the amount of nitrogen permeating into the anode area may also be reduced. As a result, power generation performance of the fuel cell stack 1 may be prevented from degrading during execution of a purge restraint operation.

What is claimed is:

1. A hydrogen purge control apparatus comprising:
   a fuel cell stack from which hydrogen is purged as necessary;
   a purged hydrogen dilution device which is disposed downstream of the fuel cell stack, and which includes a chamber formed therein, a first inlet for allowing purged hydrogen to flow into the chamber, a second inlet for allowing air to flow into the chamber, and an outlet for discharging diluted hydrogen from the chamber;
   a regulator which is disposed between the fuel cell stack and the first inlet, and which is provided for regulating an amount of the purged hydrogen flowing into the purged hydrogen dilution device; and
   a control unit which is operatively connected to the regulator, and which includes a hydrogen concentration estimating section that is configured to estimate the hydrogen concentration at the outlet of the purged hydrogen dilution device based on an operating state of the fuel cell stack,
   wherein the control unit operates the regulator depending on the hydrogen concentration estimated by the hydrogen concentration estimating section.

2. A hydrogen purge control apparatus according to claim 1, wherein the control unit operates the regulator so as to reduce the amount of the purged hydrogen flowing into the purged hydrogen dilution device when the hydrogen concentration estimated by the hydrogen concentration estimating section is equal to or greater than a predetermined value.

3. A hydrogen purge control apparatus according to claim 1, wherein the control unit operates the regulator so as to prohibit flow of the purged hydrogen into the purged hydrogen dilution device when the hydrogen concentration estimated by the hydrogen concentration estimating section is equal to or greater than a predetermined value.

4. A hydrogen purge control apparatus according to claim 2, wherein the control unit controls power generation in the fuel cell stack, and restrains power generation in the fuel cell stack when the amount of the purged hydrogen is reduced.

5. A hydrogen purge control apparatus according to claim 3, wherein the control unit controls power generation in the fuel cell stack, and restrains power generation in the fuel cell stack when the flow of the purged hydrogen is prohibited.

6. A hydrogen purge control method comprising:
   purging hydrogen from a fuel cell stack as necessary;
   diluting the purged hydrogen at a hydrogen dilution device disposed downstream of the fuel cell stack;
   estimating a hydrogen concentration at an outlet of the purged hydrogen dilution device based on an operating state of the fuel cell stack, and
   regulating an amount of the purged hydrogen flowing into a purged hydrogen dilution device based on the estimated hydrogen concentration at the outlet of the purged hydrogen dilution device.

7. A hydrogen purge control method according to claim 1, wherein the amount of the purged hydrogen flowing into the purged hydrogen dilution device is reduced when the estimated hydrogen concentration is equal to or greater than a predetermined value.

8. A hydrogen purge control method according to claim 1, wherein the flow of the purged hydrogen into the purged hydrogen dilution device is prohibited when the estimated hydrogen concentration is equal to or greater than a predetermined value.

9. A hydrogen purge control method according to claim 7, wherein power generation in the fuel cell stack is restrained when the amount of the purged hydrogen is reduced.

10. A hydrogen purge control method according to claim 8, wherein power generation in the fuel cell stack is restrained when the flow of the purged hydrogen is prohibited.

* * * * *